(12) United States Patent
Patel

(10) Patent No.: US 11,135,527 B2
(45) Date of Patent: Oct. 5, 2021

(54) COMBINED HEAT SOURCE AND VACUUM SOURCE FOR LOW-COST DISTILLATION AND DESALINATION

(71) Applicant: Dhaval T. Patel, Louisville, KY (US)

(72) Inventor: Dhaval T. Patel, Louisville, KY (US)

( * ) Notice: Subject to any disclaimer, the term of this patent is extended or adjusted under 35 U.S.C. 154(b) by 0 days.

(21) Appl. No.: 16/751,047

(22) Filed: Jan. 23, 2020

(65) Prior Publication Data
US 2020/0230517 A1 Jul. 23, 2020

Related U.S. Application Data

(60) Provisional application No. 62/795,965, filed on Jan. 23, 2019.

(51) Int. Cl.
| | | |
|---|---|---|
| *B01D 3/10* | (2006.01) | |
| *B01D 5/00* | (2006.01) | |
| *C02F 1/04* | (2006.01) | |
| *C02F 103/08* | (2006.01) | |

(52) U.S. Cl.
CPC ............. *B01D 3/10* (2013.01); *B01D 5/0006* (2013.01); *B01D 5/006* (2013.01); *C02F 1/041* (2013.01); *C02F 2103/08* (2013.01)

(58) Field of Classification Search
CPC ........ B01D 3/10; B01D 5/0006; B01D 5/006; C02F 1/041
See application file for complete search history.

(56) References Cited

U.S. PATENT DOCUMENTS

| | | | |
|---|---|---|---|
| 3,604,822 A | 9/1971 | Saxe et al. | |
| 6,010,599 A | 1/2000 | Wang et al. | |
| 8,201,402 B2* | 6/2012 | Fong ................. | F01C 13/00 |
| | | | 60/371 |
| 10,661,194 B2* | 5/2020 | Zhu ..................... | C02F 1/06 |
| 2004/0069014 A1 | 4/2004 | Chou | |
| 2018/0345167 A1* | 12/2018 | Zhu .................... | B01D 3/007 |

FOREIGN PATENT DOCUMENTS

WO    1999061125 A1    12/1999

OTHER PUBLICATIONS

International Search Report and Written Opinion of the International Searching Authority for International Patent App. No. PCT/US2020/014833 dated Apr. 16, 2020; 7 pages.

* cited by examiner

*Primary Examiner* — Jonathan Miller
(74) *Attorney, Agent, or Firm* — Ulmer & Berne LLP

(57) ABSTRACT

A distillation and desalination system can include a refrigeration unit and a vacuum source positioned in the refrigeration unit. The vacuum source can include a first chamber defining a first chamber volume, a second chamber defining a second chamber volume, a flexible diaphragm dividing the first chamber and the second chamber; and a check valve permitting gas transport into and out of the first chamber, the check valve comprising an inlet and an outlet. The system can also include a distillation unit having a distillation chamber, a saline liquid in the distillation chamber, and a headspace above the saline liquid, the headspace comprising a gas. The inlet of the check valve can be fluidically coupled to the headspace of the distillation unit.

20 Claims, 2 Drawing Sheets

COMBINED HEAT SOURCE AND VACUUM SOURCE FOR LOW-COST DISTILLATION AND DESALINATION

REFERENCE TO RELATED APPLICATIONS

The present application claims the priority benefit of U.S. provisional patent application Ser. No. 62/795,965, filed Jan. 23, 2019, and hereby incorporates the same application herein by reference in its entirety.

TECHNICAL FIELD

Embodiments of the technology relate to the conjoining of a distillation chamber and a refrigeration or freezing chamber in a synergistic manner to create thermal synergy and a vacuum source to aid both or either processes, relating to desalination technology and other distillation applications.

BACKGROUND

Desalination of salt water to make fresh water can be achieved by known processes, including thermal and reverse osmosis processes.

Thermal desalination processes use thermal means to achieve the separation of fresh water from salt in seawater. In one type of thermal desalination, separation is achieved by distillation, a process that typically requires heat and a source of vacuum. Both heat and vacuum generation are relatively costly. Mechanical vapor compression is one such method to provide a heat and vacuum source.

Accordingly, there remains an unmet need for reducing the energy cost of such thermal desalination processes and distillation processes in general.

Further, there remains an unmet need for more cost-effective and reliable source of vacuum for such desalination processes and distillation processes in general.

SUMMARY

Embodiments of a synergistically conjoined distillation chamber and a refrigeration or freezing chamber are disclosed. Embodiments of a synergistic vacuum source and heat source for thermal desalination and other distillation processes are disclosed. Additionally, embodiments of synergistic cooling or other such benefits are provided for the refrigeration or freezing processes are disclosed.

In an embodiment, the vacuum source can include first and second chambers enclosed by sidewalls, a bottom, and a top of the vacuum source. The sidewalls, bottom, and/or top can be made of heat conducting material. The first and second chambers can be separated by a flexible diaphragm. A check valve permits gas transport into and out of the first chamber. The second chamber is closed and contains water or another refrigerant that may be vaporized by a heating element in the chamber or via an external heat source. In an embodiment, the vacuum source may be in a refrigeration or freezing chamber. Condenser coils from the refrigeration or freezing processes can be directed into a distillation chamber, in which the liquid to be desalinated is, or a preheat chamber for materials that will enter in the distillation chamber. The product(s) of the distillation process can be diverted to the refrigeration or freezing processes.

In an embodiment, the vacuum source can be placed in the refrigerated or freezing chamber for operation to condense the refrigerant in the second chamber to create a vacuum in the first chamber. This vacuum source will connect to the heat exchanger inside the distillation chamber via a pressure regulator located on or in the distillation chamber. The pressure regulator will ensure a slightly higher pressure inside the heat exchanger located between the pressure regulator and the compressor to promote condensation. If the vacuum source provides an inconstant vacuum level, the compressor will re-establish the vacuum level provided by the vacuum source in the distillation chamber. The refrigerated or freezing chamber can also act as a heat source for the low-temperature thermal desalination or other distillation processes through its waste heat in addition to providing a vacuum source. Further, the product of desalination, fresh water, can be frozen in the ice maker to provide an ongoing vacuum and heat source for the thermal desalination process. Other distillation processes will similarly benefit from conjoining distillation and associated cooling processes.

Such desalination or other distillation processes may further benefit from the sale of other products or services, such as ice, air conditioning, and cold storage services provided by the refrigeration or freezing processes. Such additional revenue streams further lower the overall cost of desalination or other distillation processes.

Such desalination or other distillation processes can be extended to the point of zero liquid discharge while using any waste heat, even low-grade waste and ambient heat. Therefore, such processes may further benefit from the sale of the resultant solid waste. Such a relatively low cost zero liquid discharge process also reduces environmental costs. Such additional revenue streams and cost reductions further lower the overall cost of desalination or other distilled processes.

Such desalination or other distillation processes can be additionally benefit by allowing the use of less expensive building materials, such as the use of plastics, resulting in lower startup costs, for example.

Such desalination or other distillation processes occurring at even lower temperatures than most thermal desalination and distillation methods can additionally benefit through lower maintenance costs due to less scale formation and corrosion.

BRIEF DESCRIPTION OF THE DRAWINGS

The present disclosure will be more readily understood from a detailed description of some example embodiments taken in conjunction with the following figures.

DETAILED DESCRIPTION

Figure 1:
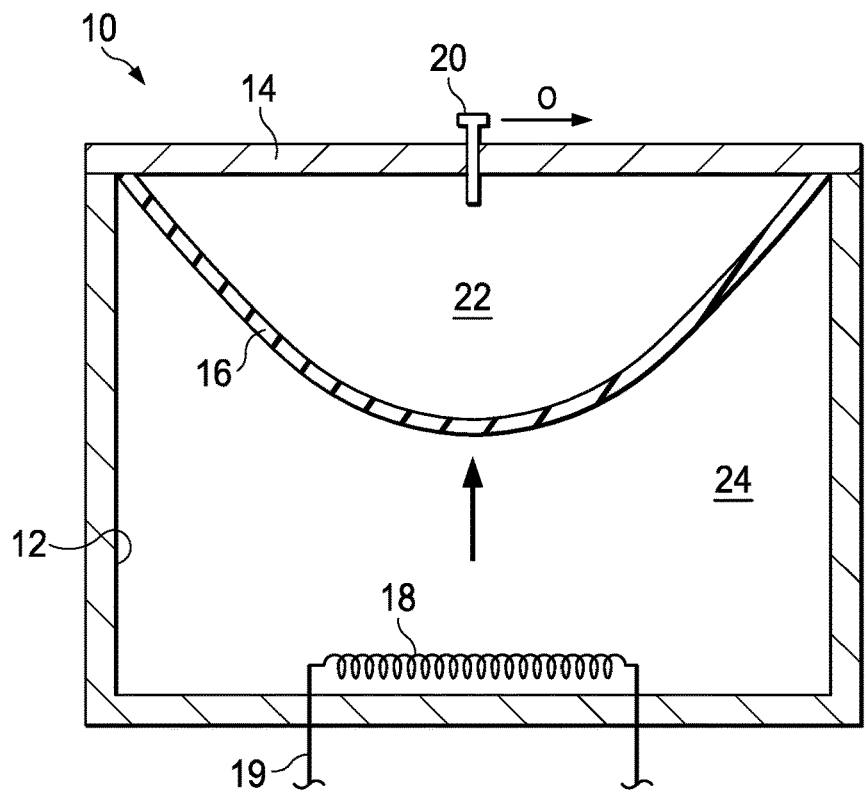
FIG. 1 depicts a schematic view of a vacuum source of the present disclosure in a first state.

Various non-limiting embodiments of the present disclosure will now be described to provide an overall understanding of the principles of the structure, function, and use of the apparatuses, systems, methods, and processes disclosed herein. One or more examples of these non-limiting embodiments are illustrated in the accompanying drawings. Those of ordinary skill in the art will understand that systems and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment," or "in an embodiment" in places throughout the specification are not necessarily all referring to the same embodiment. Furthermore, the particular features, structures or characteristics may be combined in any suitable manner in one or more embodiments.

The examples discussed herein are examples only and are provided to assist in the explanation of the apparatuses, devices, systems and methods described herein. None of the features or components shown in the drawings or discussed below should be taken as mandatory for any specific implementation of any of these the apparatuses, devices, systems or methods unless specifically designated as mandatory. For ease of reading and clarity, certain components, modules, or methods may be described solely in connection with a specific figure. Any failure to specifically describe a combination or sub-combination of components should not be understood as an indication that any combination or sub-combination is not possible. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Described herein are example embodiments of a conjoined distillation chamber and a refrigerated or freezing chamber that can, when used as described herein, provide lower heating and cooling costs and a vacuum for desalination, water filtration, and other distillation processes while possibly adding additional revenue sources to influence the economic viability of the processes. In general, embodiments of the apparatus and system of the present disclosure may include a conjoined distillation chamber and a refrigerated or freezing chamber that work synergistically to provide mutually beneficial heating and cooling sources as well as a vacuum source to allow sustainable distillation to occur at a low temperature. This vacuum source can be substituted by an external vacuum source if needed. A complete system for low temperature desalination and other distillation processes is provided by accounting for thermal energy and a vacuum source in a synergistic manner.

Referring to FIG. 1, there is shown a schematic view of a vacuum source 10 in a first state. Vacuum source 10 can be an enclosed vessel having sidewalls 12 and a removable top 14. When enclosed, vacuum source 10 can be divided into a first chamber 22 and a second chamber 24. Chambers 22 and 24 are divided by a flexible diaphragm 16 that can be secured about its perimeter to the sidewalls 12 of vacuum source 10.

Figure 2:
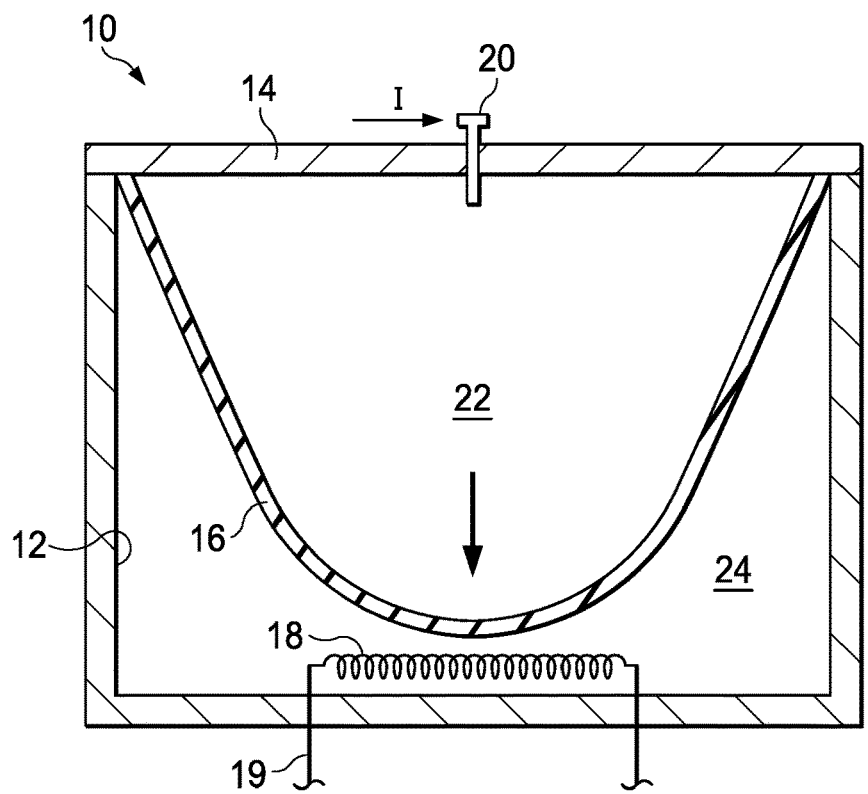
FIG. 2 depicts a schematic view of the vacuum source of FIG. 1 in a second state.

First chamber 22 has a first chamber volume, which is shown in a first state in FIG. 1. A second state of the first chamber volume is shown in FIG. 2 in which the first chamber volume is greater than that in the first state. Likewise, second chamber 24 has a second chamber volume in a first state (FIG. 1) that is greater than the volume in a second state (FIG. 2).

A check valve 20 can permit fluid communication from outside vacuum source 10, which can be at 1 atmosphere, to first chamber 22. For example, check valve 20 can permit gas, such as air, from a desalination unit to flow into the first chamber 22, as indicated by arrow "I". Check valve 20 can permit gas, such as air, out of first chamber 22 to the atmosphere, as indicated by arrow "O".

A heating element 18 can be disposed in second chamber 24. Heating element 18 can be a resistive heating element, connected via connectors 19 that lead from outside to inside the second chamber 24. Other types of energy sources and indirect means may be used to vaporize the refrigerant in second chamber 24.

The entire vacuum source 10 can be submerged in a relatively cold environment, such as an ice bath. In an embodiment, vacuum source 10 can be immersed in ice cubes. In an embodiment, vacuum source 10 can be partially or fully submerged in ice created by an ice machine, as depicted and described below with respect to FIG. 3.

Operation of the check valve 20 and heating element 18 can cause volume changes in first chamber 22 and second chamber 24, with the volume changes being facilitated by the stretch and recovery characteristics of the flexible diaphragm 16.

First chamber 22 can have enclosed non-condensable gasses, such as nitrogen or oxygen. Second chamber 24 can have enclosed therein a liquid refrigerant, such as water.

In operation, an electric current can heat the heating element 18 to a sufficient temperature and for a sufficient time to cause the refrigerant in second chamber 24 to vaporize. Vaporization of the refrigerant in the second chamber 24 causes the volume of second chamber 24 to increase, with a corresponding decrease in volume of first chamber 22. In an embodiment, the volume of second chamber 24 can increase to a volume substantially the same as the vacuum source 10, such that the volume of first chamber 22 decreases to substantially zero. Due to the increase in volume of the second chamber 24, gas is pushed out of the first chamber 22 through the outlet "O" of check valve 20 (e.g., FIG. 1). After the vapor has formed, the heating element 18 may be deactivated. Freezing temperatures around vacuum source 10 can cause the refrigerant vapor in second chamber 24 to condense, thereby causing a corresponding reduction in the volume of second chamber 24 and an increase in the volume of first chamber 22. As can be understood from the description herein, the condensation of water in second chamber 24 that causes an increase in volume of first chamber 22 also causes a partial pressure in first chamber 22. The partial pressure in first chamber 22 can be considered a vacuum and can cause gas to be drawn into the first chamber 22 through inlet "I" of check valve 20 (e.g., FIG. 2). This heating/cooling process may be repeated or cycled to repeatedly draw gas into the first chamber 22.

In an embodiment, the gas being drawn into first chamber 22 can be drawn from a desalination/distillation unit via a compressor and heat exchanger. That is, the vacuum chamber 10 can be used to create the vacuum utilized in a desalination/distillation unit. Any loss in vacuum from vacuum chamber 10 to the desalination/distillation unit can be regained by the action of the compressor. In an embodiment, a partial pressure of −29.5 inches of mercury can be achieved. Under such a vacuum, the boiling point of seawater is near 11 degrees Celsius.

In an embodiment, the cycle of chamber volume increase and decrease can be repeated to cyclically draw a vacuum through inlet "I" of check valve 20. In an embodiment, a series of vacuum chambers 10 can be utilized with a single desalination unit to increase the vacuum efficiency of the desalination process by facilitating a substantially constant vacuum at the desalination unit.

In an embodiment, the freezing temperatures that surround vacuum source 10 can be provided by ice, i.e., frozen water. In an embodiment, the ice can be from an ice maker, in which the vacuum source 10 is submerged. Thus, in an embodiment, the vacuum source of the present invention takes advantage of existing sources of cooling, thereby harvesting thermal advantages. Thus, in an embodiment, the vacuum source can be placed in a refrigerated space for operation to condense the refrigerant. In an embodiment, the refrigerated space can be an ice maker, which can also act as a heat source for low-temperature thermal desalination through its waste heat in addition to providing a vacuum source. Further, the product of desalination, fresh water, which is near 11 Celsius, can be frozen in the ice maker at a lower energy cost than for ice makers using water at ambient temperatures. This provides low-cost leadership in ice while providing an ongoing vacuum and heat source for the thermal desalination process.

Figure 3:
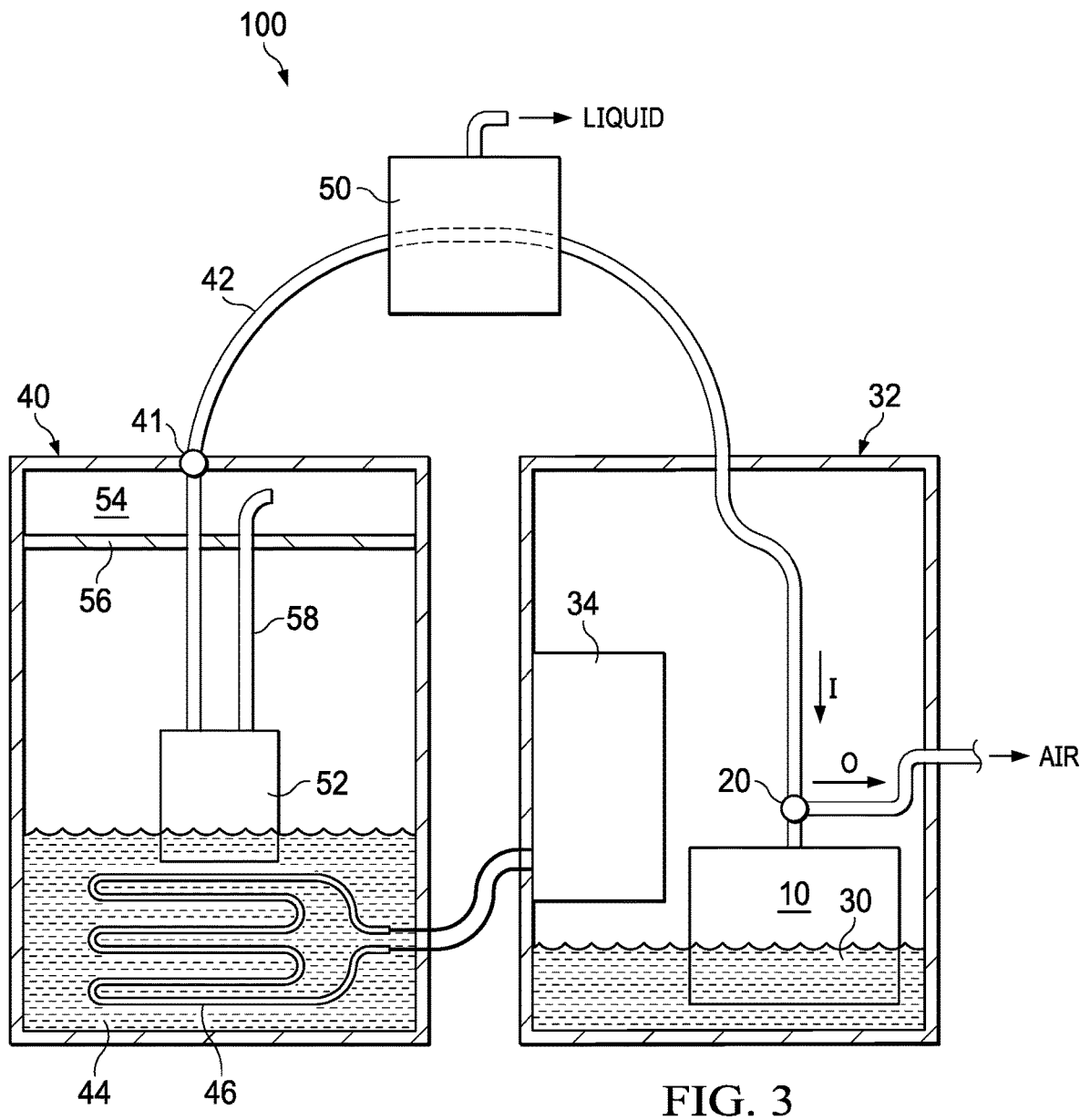
FIG. 3 depicts a schematic view of an embodiment of a conjoined distillation chamber and a refrigerated or freezing chamber creating thermal synergy and a vacuum source.

Referring now to FIG. 3, there is depicted schematically a system 100 that is a combined heat source and a vacuum source for desalination. As shown, the vacuum chamber 10 can be placed in ice 30 inside an ice making machine 32 that includes an ice-maker 34. As shown and described above, the check valve 20 that permits gas to be drawn from the head space 54 of a desalination chamber 40 through a vacuum tube 42 into the vacuum chamber 10. The gas may be drawn through the vacuum tube 42 via a gas/liquid separator 50, a compressor/heat exchanger 52, and a water vapor inlet tube 58, which can originate in the head space 52, above a demister 56. There may be a pressure regulator 41 coupled to the vacuum tube 42, for example, where the vacuum tube 42 enters the desalination chamber 40. The level of the vacuum reaching the head space of the desalination chamber 40 should be at a similar level as created by vacuum chamber 10. The loss of vacuum along the route and in the heat exchanger can be regained by the action of the compressor. A saline liquid, or water to be desalinated, e.g., seawater 44 may be inside desalination chamber 40. The seawater 44 can cover and submerge a condensation coil 46 through which heat exhaust from the ice-maker 34 can circulate. Other sources of heat in the desalination chamber 40 can include exhaust heat from the compressor and other sources, and ambient heat from air or liquid sources.

In an embodiment, as shown in FIG. 3, the compressor/heat exchanger 52 can be fully or partially submerged in the seawater 44 in the desalination chamber 40. Additionally, the compressor can be outside the desalination chamber 40 for easy access, while connecting to the heat exchanger inside the desalination chamber 40. The compressor elevates the vacuum level inside the desalination chamber 40 while increasing the pressure of the water vapor and causing its condensation in the heat exchanger. This embodiment depicts a single stage vapor compression desalination unit. However, multiple stages with various feed options can be used. Also, various evaporator and condenser options can be used. The desalination unit can be configured without a compressor as well as in multi-effect distillation. Water and non-condensable gases will leave the heat exchanger via the vacuum tube 42. Subsequently, water will be separated from air in a gas/liquid separator 50. In other words, vapor in the gas exiting the distillation unit will be condensed and separated from the non-condensable gases; the condensed liquid may exit the gas/liquid separator 50. The non-condensable gases will continue on to the vacuum source 10. Through this process, the liquid exiting the gas/liquid separator 50 has been desalinated.

In an embodiment, the vacuum source 10 as disclosed herein can enable a level of vacuum in the desalination chamber 40 such that seawater 44 can boil at 40 degrees Fahrenheit. Heat transferred from the condensation coil 46 can enable the requisite increase in temperature of the seawater 44. In an embodiment, the desalinated water, such as at a temperature of 40 degrees Fahrenheit, can be converted to ice at 32 degrees Fahrenheit. In this manner, ice can be made in an efficient manner. In an embodiment, the ice so made can also cool the vacuum source 10, such as in an ice maker.

In an embodiment, vacuum source 10 can be made of cast iron, plastics, stainless, steel, duplex stainless steel, nickel-aluminum bronze or various other materials that allow for thermal conductivity and strength. Additionally, the vacuum source 10 can be constructed in the shape of a cylinder or various other shapes as desired for the application. The flexible diaphragm 16 can be made of rubber (such as ethylene propylene diene monomer), polytetrafluoroethylene (PTFE), or other plastics or elastomers that are impermeable to air and water and can be joined, for example, to the sidewalls 12 of the vacuum source 10. The heating element 18 can be a waterproof heating element powered by alternating or direct current or nanoparticles heated by light.

The foregoing description of embodiments and examples has been presented for purposes of illustration and description. It is not intended to be exhaustive or limiting to the forms described. Numerous modifications are possible in light of the above teachings. Some of those modifications have been discussed, and others will be understood by those skilled in the art. The embodiments were chosen and described in order to best illustrate principles of various embodiments as are suited to particular uses contemplated. The scope is, of course, not limited to the examples set forth herein, but can be employed in any number of applications and equivalent devices by those of ordinary skill in the art. Rather it is hereby intended the scope of the invention to be defined by the claims appended hereto.

What is claimed is:

1. A vacuum source, comprising:
   a. a first chamber and a second chamber, both the first chamber and the second chamber enclosed by sidewalls and a top of the vacuum source, the first chamber and the second chamber being separated by a flexible diaphragm;
   b. a check valve permitting gas transport into and out of the first chamber;
   c. a heating element in the second chamber; and
   d. refrigerant in the second chamber.

2. A desalination system, comprising:
   a. a heat source, the heat source comprising an ice maker and an ice bath,
   b. the vacuum source of claim 1 at least partially immersed in the ice bath, and
   c. a desalination chamber, the desalination chamber comprising water to be desalinated and a head space above the water, the desalination chamber being operably connected to the heat source by a vacuum tube from the head space to the vacuum source and by a condensation tube connected on a first end to the ice maker and at a second end to a condensation coil immersed in the water.

3. A distillation and desalination system, comprising:
a. a refrigeration unit;
b. a vacuum source positioned in the refrigeration unit, the vacuum source comprising;
   i. a first chamber defining a first chamber volume;
   ii. a second chamber defining a second chamber volume;
   iii. a flexible diaphragm dividing the first chamber and the second chamber; and
   iv. a check valve permitting gas transport into and out of the first chamber, the check valve comprising an inlet and an outlet; and
c. a distillation unit comprising;
   v. a distillation chamber;
   vi. a saline liquid in the distillation chamber; and
   vii. a headspace above the saline liquid, the headspace comprising a gas,
wherein the inlet of the check valve is fluidically coupled to the headspace of the distillation unit.

4. The system of claim 3, wherein the distillation unit further comprises a heat source.

5. The system of claim 4, wherein the heat source is coupled to heat exhaust from the refrigeration unit.

6. The system of claim 4, wherein the heat source comprises a condensation coil in contact with the saline liquid.

7. The system of claim 3, further comprising a vacuum tube that fluidically couples the inlet of the check valve and the headspace of the distillation unit.

8. The system of claim 7, further comprising a gas/liquid separator coupled to the vacuum tube between the distillation unit and the vacuum source, the gas/liquid separator configured to separate a desalinated liquid from the gas.

9. The system of claim 3, wherein the distillation unit further comprises a heat exchanger and a compressor.

10. The system of claim 9, further comprising a vacuum tube that fluidically couples the inlet of the check valve and the heat exchanger, and a vapor inlet tube that fluidically couples the heat exchanger to the headspace.

11. The system of claim 3, wherein the vacuum source further comprises a heating element for heating contents of the second chamber.

12. The system of claim 11, wherein the second chamber comprises a refrigerant.

13. The system of claim 12, wherein the heating element is activated to heat the refrigerant to form a refrigerant vapor in the second chamber.

14. The system of claim 13, wherein condensation of the refrigerant vapor in the second chamber causes a decrease in the second chamber volume.

15. The system of claim 13, wherein the decrease in the second chamber volume causes a first vacuum in the first chamber and a corresponding vacuum in the headspace that forces a portion of the gas to flow from the headspace through the inlet of the check valve and into the first chamber of the vacuum source.

16. A method of desalinating the saline liquid using the distillation and desalination system of claim 3, the method comprising:
heating the saline liquid to form the gas in the headspace;
heating a refrigerant in the second chamber to form a refrigerant vapor causing an increase in the second chamber volume;
condensing the refrigerant vapor causing a decrease in the second chamber volume, wherein the decrease in the second chamber volume causes a first vacuum in the first chamber and a corresponding vacuum in the headspace that forces a portion of the gas to flow from the headspace through the inlet of the check valve and into the first chamber of the vacuum source; and
separating a desalinated liquid from the portion of the gas.

17. The method of claim 16, further comprising repeatedly heating the refrigerant and condensing the refrigerant vapor.

18. The method of claim 16, wherein separating the desalinated liquid from the gas occurs between the portion of the gas flowing from the headspace and through the inlet of the check valve.

19. The method of claim 16, wherein heating the saline liquid to form the gas in the headspace comprises using heat exhaust from the refrigeration unit.

20. The method of claim 16, further comprising cooling or freezing the desalinated liquid using the refrigeration unit.

* * * * *